UNITED STATES PATENT OFFICE.

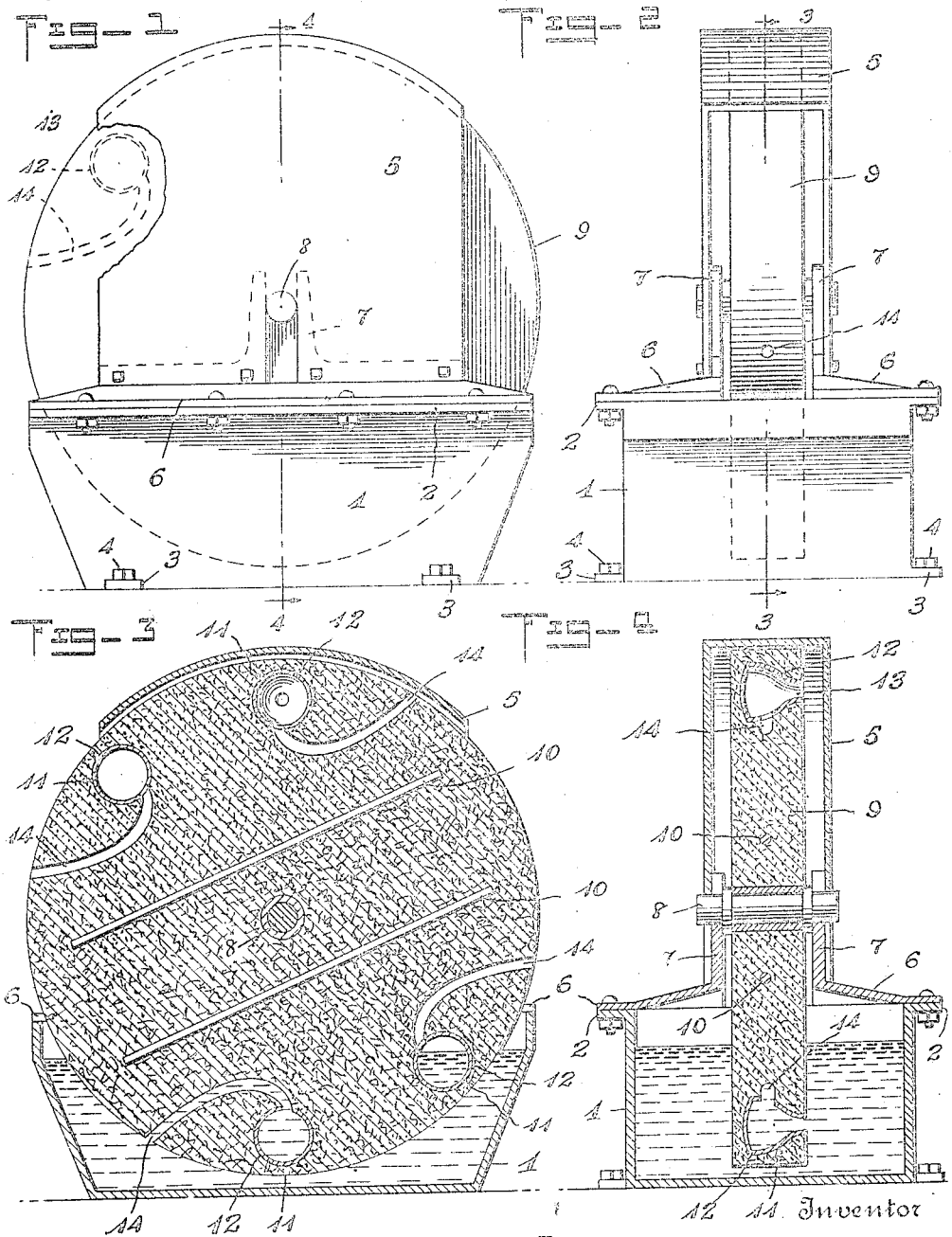

WILLIAM J. MARSH, OF DEXTER, IOWA.

ANIMAL-OILING DEVICE.

1,225,456.  Specification of Letters Patent.  Patented May 8, 1917.

Application filed July 21, 1916. Serial No. 110,595.

*To all whom it may concern:*

Be it known that I, WILLIAM J. MARSH, a citizen of the United States, residing at Dexter, in the county of Dallas and State of Iowa, have invented certain new and useful Improvements in Animal-Oiling Devices; and I do declare the following to be a full, clear, and exact description of the invention, such as will enable others skilled in the art to which it appertains to make and use the same.

This invention relates to certain new and useful improvements in animal oiling devices of that general class wherein the oil or insecticide is applied to the body of the animals by their rubbing against certain parts of the device.

The primary object of the invention is to construct a device of this character of cement, whereby great satisfaction is afforded the animals when rubbing against the same.

Another object of the invention is to provide a device of this character which includes a tank, a rotating member mounted adjacent the tank and having a portion projecting into the same, whereby the contents of the tank is dipped up upon rotation of the member and spilt over the latter.

A further object of the invention is to provide an oiling device of this character which may be operated from either of its sides.

An additional object of the invention is to generally improve upon devices of this nature by the provision of a device which will be simple, strong, durable and inexpensive in construction, efficient and reliable in operation, easy to repair, and well adapted to the purpose for which it is designed.

With these and numerous other objects in view, my invention consists of certain novel features of construction, and the combination and arrangement of parts as will be hereinafter fully described and claimed.

In the accompanying drawings, forming a part of the application and in which similar reference characters designate like parts throughout the several views:

Figure 1 is a side elevation of a device constructed in accordance with this invention;

Fig. 2 is an end elevation of the same;

Fig. 3 is a vertical longitudinal sectional view taken on the plane of the line 3—3 of Fig. 2;

Fig. 4 is a vertical transverse sectional view taken on the plane of the line 4—4 of Fig. 1; and Fig. 5 is a detail perspective view on an enlarged scale of one of the cups.

Referring more particularly to the drawings, the reference numeral 1 designates a rectangular tank which may be constructed from any suitable material, but which is preferably made of cast iron. As clearly shown in Fig. 2, the upper edges of the sides of the tank 1 are provided with laterally and outwardly extending flanges 2. The ends of the tank 1 are inclined inwardly from a point spaced a slight distance below the upper edges thereof. This construction provides a means for preventing the tank from bursting, should the contents of the same become frozen during cold weather, as will be readily understood. Extending horizontally from the opposite sides of the tank at the lower edges thereof are lugs 3 through which extend suitable anchoring elements 4 to firmly fix the tank to the ground or other support.

The numeral 5 designates a U-shaped hood constructed preferably of sheet metal and having the lower ends of its spaced upright sides secured by suitable securing elements to the upwardly extending flanges of a pair of plates 6. These plates 6 have their side edges bolted to the flanges 2 carried by the tank. As shown in Fig. 1, the plates 6 extend the entire length of tank and are slightly inclined downwardly from their inner to their outer sides so as to shed rain should the device be placed in a field, or other place not under cover. Extending upwardly from the upright flanges carried by the plates 6 are bearings 7 for the shaft 8 of the rotating dipping member now to be described.

The dipping member is here shown as comprising a circular wheel 9, which is constructed of cement and having metal reinforcements 10 extending therethrough. These reinforcements 10 may be of any convenient form and may extend through the wheel in any direction desired.

Molded in the wheel 9 near the periphery thereof and at spaced distances apart, is a plurality of pockets 11, in which are disposed substantially pear-shaped metal cups 12. These cups form the mold for the pockets 11 when the wheel is being molded and are provided with openings 13 at their smaller end for a purpose to be described. Extending through the wheel from the periphery thereof and communicating with the interior of the cups 12 are passages 14. These passages 14 are curved longitudinally and are arranged substantially angular with respect to the periphery of the wheel, the alternate ones extending in opposite directions.

In using the device, the tank 1 is filled with oil or other suitable insecticide, disinfectant or the like, and the device is placed in a barn yard, field, or wherever desired. The animals affected with parasites or the like will rub against the wheel and cause the same to rotate in a direction according to which side they are on. This causes the lower portion of the wheel to be moved through the liquid, the latter gaining entrance to the pockets 11 through the openings 13 and being dipped up by the same. As the wheel is revolved the oil thus dipped up will be spilt over the periphery of the same, from which it will be applied directly to the body of the animals. The hood 5 and plates 6 prevent rain and dirt from getting into the tank.

From the foregoing description, it may be seen that the objects of the invention have been readily carried out, as a very simple, durable and inexpensive device has been constructed, and one which may be easily cleaned and repaired if necessary. The use of cement for constructing the rotating rubbing member is valuable because of the fact that the rough rubbing surface of the cement affords great satisfaction to the animals when rubbing against the same. Furthermore, no oil or insecticide is wasted as the same is not dispensed too freely, owing to the curvature of the passages leading from the cups, which are in effect wells.

As numerous changes in form, proportion and in the minor details of construction may be resorted to without departing from the spirit of the invention, I do not wish to be limited to the construction herein shown and described other than that set forth in the appended claims.

I claim:—

1. A device of the class described comprising a tank, and a rotating cement member supported adjacent said tank and having a portion thereof projecting into the same, said member having pockets molded therein, to form wells for dipping up the contents of said tank and spilling it over the same.

2. A device of the class described comprising a rectangular tank, plates secured to the upper edge of said tank and inclining downwardly from their inner to their outer edges, flanges struck upwardly from the inner edges of said plates and having bearings therein, a shaft rotatably mounted in said bearings and having a wheel fixed thereon, said wheel having a portion thereof projecting into said tank and having pockets arranged on the periphery thereof, and a U-shaped hood having the lower ends of its sides fixed to said flanges and covering said wheel.

3. A device of the class described comprising a tank, a wheel rotatably mounted on said tank and having a portion projecting into the same, pockets in said wheel near its periphery having contracted inlets opening in one side thereof, and outlets opening from the inner portions of said pockets and extending to the periphery of said wheel.

4. A device of the class described comprising a tank, a cover for said tank having a central longitudinal opening, material on the edges of said opening extending upwardly and forming flanges, bearings extending upwardly from said flanges midway the length thereof, a wheel having axially projecting studs received in said bearings, a portion of said wheel projecting through said opening into the tank, an inverted U-shaped hood covering the major portion of said wheel, the lower ends of the side portions of the hood having notches therein alined with the bearings on the aforesaid flanges, said studs extending through the bearings and notches, and means for securing the lower ends of said side portions of the hood to said flanges.

In testimony whereof I have hereunto set my hand in the presence of two subscribing witnesses.

WILLIAM J. MARSH.

Witnesses:
J. H. TODD,
B. J. HICKS.